United States Patent [19]
Oshima et al.

[11] Patent Number: 6,103,345
[45] Date of Patent: Aug. 15, 2000

[54] DECORATIVE SHEET WITH CHANGEABLE COLOR OR DENSITY

[75] Inventors: Masahiro Oshima; Katsumi Shimizu; Tatsurou Ohtani, all of Osaka, Japan

[73] Assignee: Meiwa Gravure Co., Ltd., Osaka, Japan

[21] Appl. No.: 09/006,220

[22] Filed: Jan. 13, 1998

Related U.S. Application Data

[63] Continuation-in-part of application No. 08/659,910, Jun. 7, 1996, Pat. No. 5,866,233.

[30] Foreign Application Priority Data

Feb. 12, 1995 [JP] Japan .................................. 7-144358

[51] Int. Cl.⁷ ........................................................ B32B 3/00
[52] U.S. Cl. ................ 428/172; 428/187; 428/201; 428/204; 428/207; 428/212; 428/542.2
[58] Field of Search ..................................... 428/141, 167, 428/156, 187, 207, 209, 212, 172, 542.2, 201, 204

[56] References Cited

U.S. PATENT DOCUMENTS

| | | | |
|---|---|---|---|
| 5,204,160 | 4/1993 | Rouser | 428/167 |
| 5,254,390 | 10/1993 | Lu | 428/156 |
| 5,270,097 | 12/1993 | Amemiya et al. | 428/156 |
| 5,429,857 | 7/1995 | Amemiya et al. | 428/156 |
| 5,624,732 | 4/1997 | Oshima et al. | 428/167 |
| 5,866,233 | 2/1999 | Oshima et al. | 428/172 |

FOREIGN PATENT DOCUMENTS

| | | |
|---|---|---|
| 59-136300 | 8/1984 | Japan . |
| 63-257637 | 10/1988 | Japan . |
| 4-14500 | 1/1992 | Japan . |
| 4-117750 | 10/1992 | Japan . |
| 7-15337 | 3/1995 | Japan . |

*Primary Examiner*—Donald Loney
*Attorney, Agent, or Firm*—Kubovcik & Kubovcik

[57] ABSTRACT

A decorative sheet formed by a transparent sheet body having a certain thickness and having front and rear surfaces, the transparent sheet being simply provided on its front surface and rear surfaces with parallel striped patterns with predetermined pitches, to thereby produce a decorative sheet excellent in decorativeness with color tone or colors changeable with the angle of observation.

24 Claims, 9 Drawing Sheets

DECORATIVE SHEET WITH CHANGEABLE COLOR OR DENSITY

This application is a Continuation-In-Part of application Ser. No. 08/659,910, filed Jun. 7, 1996 now U.S. Pat. No. 5,866,233.

BACKGROUND OF THE INVENTION

1. Field of the Invention

The present invention relates to a decorative sheet, which is applicable to a sheet for window decoration, a bathroom curtain, and the like.

2. Description of the Background Art

In general, a well-known decorative body having a pattern or colors which vary with the angle of observation employs a lenticular plate, a polarizing plate or the like.

When a lenticular plate is used for a decorative sheet, it is necessary to correctly match the pitches of the lenticular plate and a print with each other. Thus, the manufacturing steps are complicated and the cost is increased, while the number of defects cannot be ignored. Further, the lenticular plate has a repetitive structure of semicylindrical lenses. Therefore, a decorative sheet superposed with the lenticular plate is readily broken through slit lines which are defined by trough portions of such semicylindrical lenses.

On the other hand, a decorative body employing a polarizing plate is complicated in structure due to rotation of the polarizing plate etc., and hence the cost is disadvantageously increased.

SUMMARY OF THE INVENTION

An object of the invention is to provide a sheet which is excellent in decorativeness and has a simple structure and practical strength at a low cost, with color tone or colors varying with the angle of observation.

In order to attain this object, a transparent, sheet body having a certain thickness is provided on its front and rear surfaces with parallel striped patterns at predetermined pitches according to the present invention. The striped patterns provided on the front and rear surfaces are observed in positional relation which varies with the angle of observation through the thickness of the sheet body. The striped patterns can be seen brightened when the sheet is observed at such an angle that light passing through the spaces between the stripes provided on the rear surface passes through those between the stripes provided on the front surface. On the other hand, the striped patterns can be seen darken when the sheet is observed at such an angle that the light passing through the spaces between the stripes provided on the rear surface strikes the stripes provided on the front surface and at such an angle that the light strikes the stripes provided on the rear surface. Thus, the color tone of the sheet continuously varies with the passage of the light, as the angle of observation is continuously changed.

According to the invention, the striped patterns which are provided on at least one of the front and rear surfaces of the transparent sheet body may be color-coded. Where the striped pattern provided on the front surface is color-coded, the color can be recognized when the sheet is observed at such an angle that light passing through the spaces between the stripes provided on the rear surface strikes the stripes provided on the front surface. Where the striped pattern provided on the rear surface is color-coded, on the other hand, the color can be recognized when the sheet is observed at such an angle that light strikes the striped pattern on the rear surface. Thus, the color tone or the colors of the sheet continuously vary with the changes in the passage of the light when the angle of observation is continuously changed. Thus, the sheet can be further improved in design and decorativeness.

Further, according to the invention, a pattern may be formed on at least one of the front and rear surfaces of the transparent sheet body with a pitch deviating from the predetermined pitch of the striped patterns. In this embodiment, the pitch deviation changes the positional relation between the striped pattern on the front surface and that of the rear surface. Thus, parts to be seen brightened and parts to be seen darken can be observed in variable ratios even if they are observed at the same angle of observation as in the case of no pitch deviation being provided, and the formed pattern can be clearly recognized by its color depth even at a fixed angle in a stationary state. Also, when the angle of observation is continuously changed, the color tone or the color of the formed pattern continuously varies with the angle, so that further excellent design and decorativeness is provided.

According to the invention, a projections-and-depressions pattern which is parallel to the striped patterns may be provided on at least one of the front and rear surfaces of the transparent sheet body. In this embodiment, the light is refracted on the surface of the projections-and-depressions pattern so that its components interfere with each other, and the color tone or the color of the projections-and-depressions pattern can be changed with a moire fringes provided at different angles of observation, to provide a stereoscopic effect.

According to the invention, an adhesive layer may be provided on either one of the front and rear surfaces of the transparent sheet body. Since the color depth levels, colors and patterns of the decorative sheet, visually observable when viewed from the front surface, are different from those visually observable when viewed from the rear surface, the adhesive layer previously provided on the front or rear surface of the sheet body is useful for preventing the front and rear surfaces from being confused with each other. Further, it prevents air pockets when the sheet is stuck on a window and the like. In addition, it can prevent the window glass from being broken into pieces and scattered.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
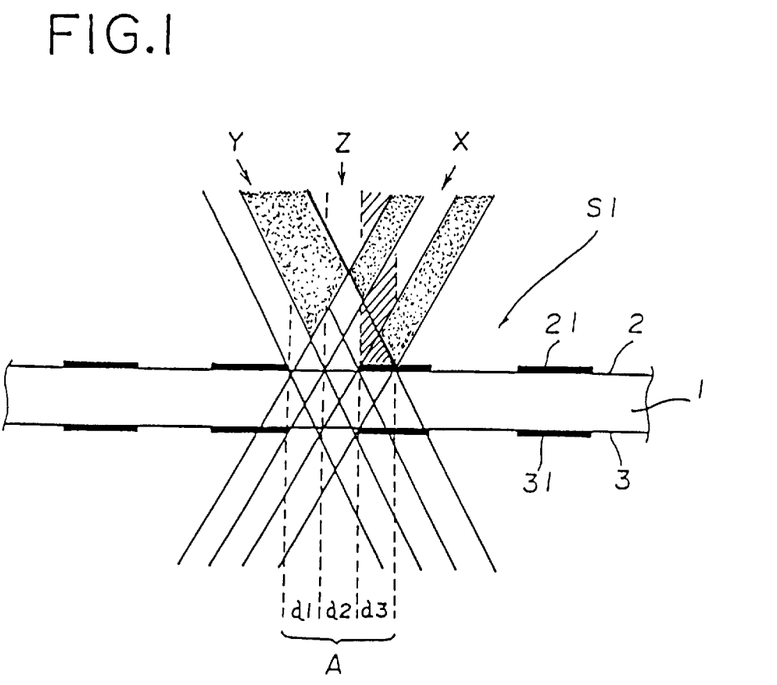
FIG. 1 is a sectional view showing a first embodiment of a decorative sheet according to the present invention.

As shown in FIG. 1, a decorative sheet S1 according to a first embodiment of the invention comprises a transparent sheet body 1 having a certain thickness. The sheet body 1 comprises a front surface 2 which is provided with a printed striped pattern 21 of a plurality of parallel straight lines with a predetermined pitch and a rear surface 3 which is also provided with a printed striped pattern 31 of a plurality of parallel straight lines with a predetermined pitch, similarly to the front surface 2.

The transparent sheet body 1 may have such a thickness that the relative positional relation between the striped patterns 21 and 31 provided on the front and rear surfaces 2 and 3 can be changed when observed from different angles. Also, the same may be made of any material which is transparent and able to transmit light. For example, a general purpose sheet of synthetic resin such as polyethylene, polypropylene, polyester, nylon, polyurethane, polyvinyl chloride, polyvinyl acetate or polyacrylic resin is employed as the material for the transparent sheet body 1, while a polyacrylic resin sheet or a soft vinyl chloride sheet is preferably employed in terms of weather resistance or flexibility.

The printing method for forming the striped patterns 21 and 31 is not particularly restricted, so far as a method such as gravure printing or offset printing enabling correct registration is employed. Further, the pitches of the striped pattern 21 printed on the front surface 2 and those of the striped patterns 31 printed on the rear surface 3 may be identical to, different from, aligned with or deviated from each other, so far as these striped patterns 21 and 31 are formed with predetermined pitches. In addition, the striped patterns 21 and 31 may be in any patterns so far as a number of parallel stripes are formed with predetermined intervals. These striped patterns 21 and 31 may be formed by straight lines, as in this embodiment, or a number of curves consisting of sine curves which are identical in wavelength and amplitude to each other and are provided in parallel with each other.

When a part A of the decorative sheet 1 is observed from a direction X in FIG. 1, light at a2 is not blocked off by the striped patterns 21 and 31 and thus is seen brightened. At a1 the light strikes on the striped pattern 31 of the rear surface 3 and does not reach the front surface 2. At a3 the light is transmitted through a space between the stripes on the rear surface 3 but strikes on the striped pattern 21 on the front surface 2. Thus, the parts at a1 and a3 are seen darkened.

When the part A is observed from a direction Y, at a1 the light is not blocked off by the striped patterns 21 and 31 and thus is seen brightened. At a2 the light strikes on the striped pattern 31 on the rear surface 3 and does not reach the front surface 2. At a3, the light is transmitted through a space between the stripes 31 on the rear surface 3 but strikes on the striped pattern 21 on the front surface 2. Thus, the parts at a2 and a3 are seen darkened.

When the part A is observed from a direction Z, the light is not blocked off by the striped patterns 21 and 31 and thus is seen brightened at a1 and a2. However, at a3 the light strikes on the striped pattern 31 on the rear surface 3 and does not reach the front surface 2, and thus the part at a3 is seen darkened.

Thus, the part A of the decorative sheet S1 has different bright and dark parts as viewed from the directions X, Y and Z, respectively. The part A is seen dark as viewed from the directions X but it is seen bright from the direction Z. With continuous changes in the angle for observing this decorative sheet Si, the light will travel along various passages so that it can pass through the rear surface 3, be blocked off by the striped pattern 31 on the rear surface 3, pass through the front surface 2, or be blocked off by the striped pattern 21 on the front surface 2. Thus, the color tone of the decorative sheet S1 continuously varies with the passages.

In practice, the decorative sheet S1 is prepared by employing a transparent soft vinyl chloride sheet of 0.2 mm in thickness as the transparent sheet body 1, and gravure-printing the striped patterns 21 and 31 of black parallel straight lines of 0.25 mm in width at pitches of 0.5 mm on the front and rear surfaces 2 and 3 of the sheet body 1 respectively in an aligned manner.

A sample of this decorative sheet S1 has been applied to window decoration, to prove that the decorative sheet is at a low cost and excellent in design and decorativeness with sufficient practical strength.

Embodiment 2

Figure 2:
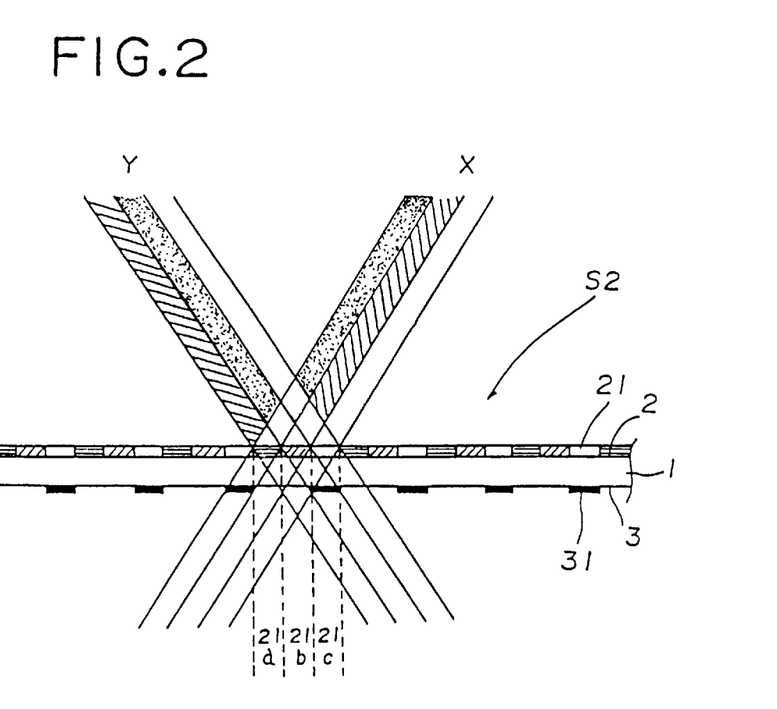
FIG. 2 is a sectional view showing a second embodiment of the present invention.

FIG. 2 shows a second embodiment of the present invention.

A decorative sheet S2 according to the second embodiment is prepared by forming on a front surface 2 a striped pattern of parallel straight lines comprising multicolor printing layers 21a, 21b and 21c.

Also in the second embodiment, the colors of the printing layers 21b and 21c can be observed from a direction X while those of the printing layers 21a and 21c can be observed from a direction Y, similarly to the first embodiment. When the striped pattern is formed in a small pitch width, the respective colors are not distinguishable but mixedly recognized in practice. When the angle for observing the decorative sheet S2 is continuously changed, therefore, the colors appear continuously changed.

In practice, the decorative sheet S2 is prepared by employing a transparent soft vinyl chloride sheet of 0.2 mm in thickness as a transparent sheet body 1. Parallel stripes consisting of red, blue and yellow straight lines 21a, 21b and 21c of 0.2 mm in width are printed on the overall front surface 2 of the sheet body 1 at a pitch of 0.6 mm, and a striped pattern consisting of black parallel straight lines of 0.2 mm in width is printed on a rear surface 3 of the sheet body 1 at a pitch of 0.6 mm, so as to be in coincidence with the striped pattern on the front surface 2.

A sample of this decorative sheet S2 has been applied to formation of a bag, to prove that the decorative sheet has excellent decorativeness with the colors changeable as the bag swings.

Embodiment 3

Figure 3:
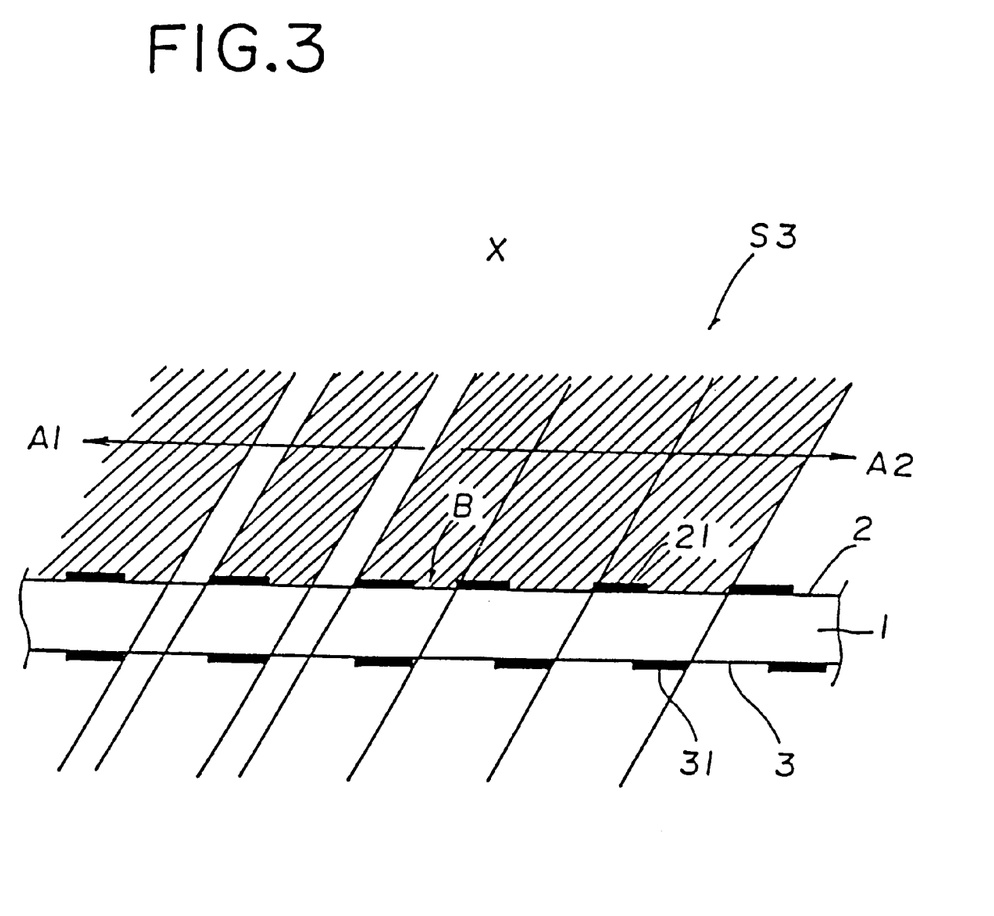
FIG. 3 is a sectional view showing a third embodiment of the present invention.

FIG. 3 shows a third embodiment of the invention.

A decorative sheet S3 has a front surface 2 on which a striped pattern 21 is shifted by a certain pitch. The pattern is seen bright at A1 but dark at A2 under the boundary of a part B of the front surface even if it is observed from a same angle. Thus, the contour of the pattern can be clearly recognized by the pattern of light and dark even if the same is observed at a fixed angle in a stationary state. In addition, when the angle of observation is continuously changed, the color tone and the color of the pattern are continuously changed.

Figure 4:
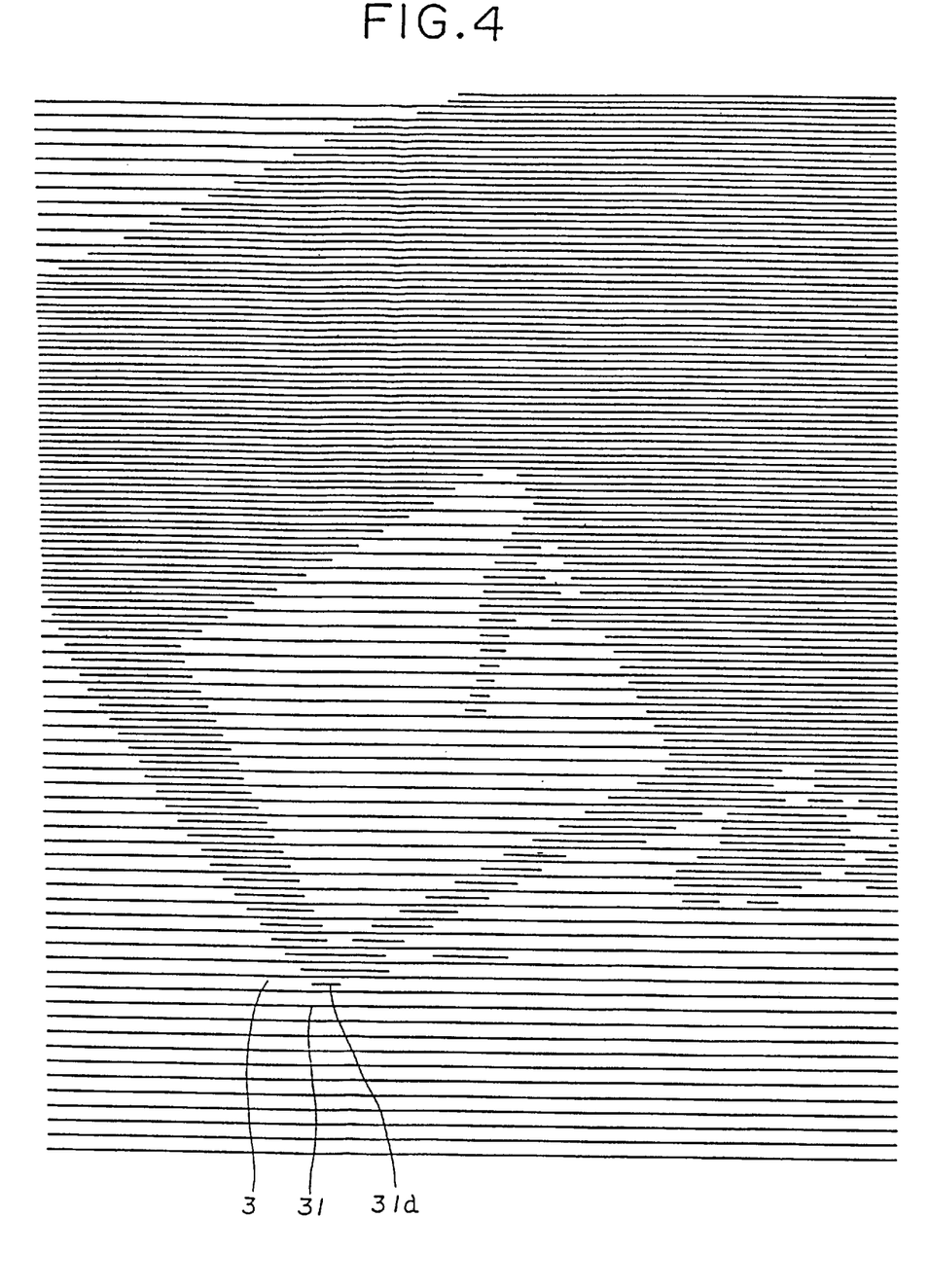
FIG. 4 is a partially enlarged view showing the rear surface of the decorative sheet according to the third embodiment of the present invention.

In practice, the decorative sheet S3 is prepared by employing an acrylic sheet of 0.3 mm in thickness as a transparent sheet body 1. A striped pattern 31 consisting of parallel stripes of 0.25 mm in width is printed on the overall rear surface 3 at a pitch of 1 mm, and a striped pattern 31a consisting of straight Lines of 0.25 mm in width is formed with a pitch of 0.5 mm on portions of the rear surface corresponding to the pattern formed on the front surface 2. FIG. 4 is a partially enlarged view showing the rear surface 3. As shown in FIG. 4, it is possible to make the pattern further conspicuous by changing the pitch of the portions of the rear surface corresponding to the pattern formed on the front surface 2.

Figure 5:
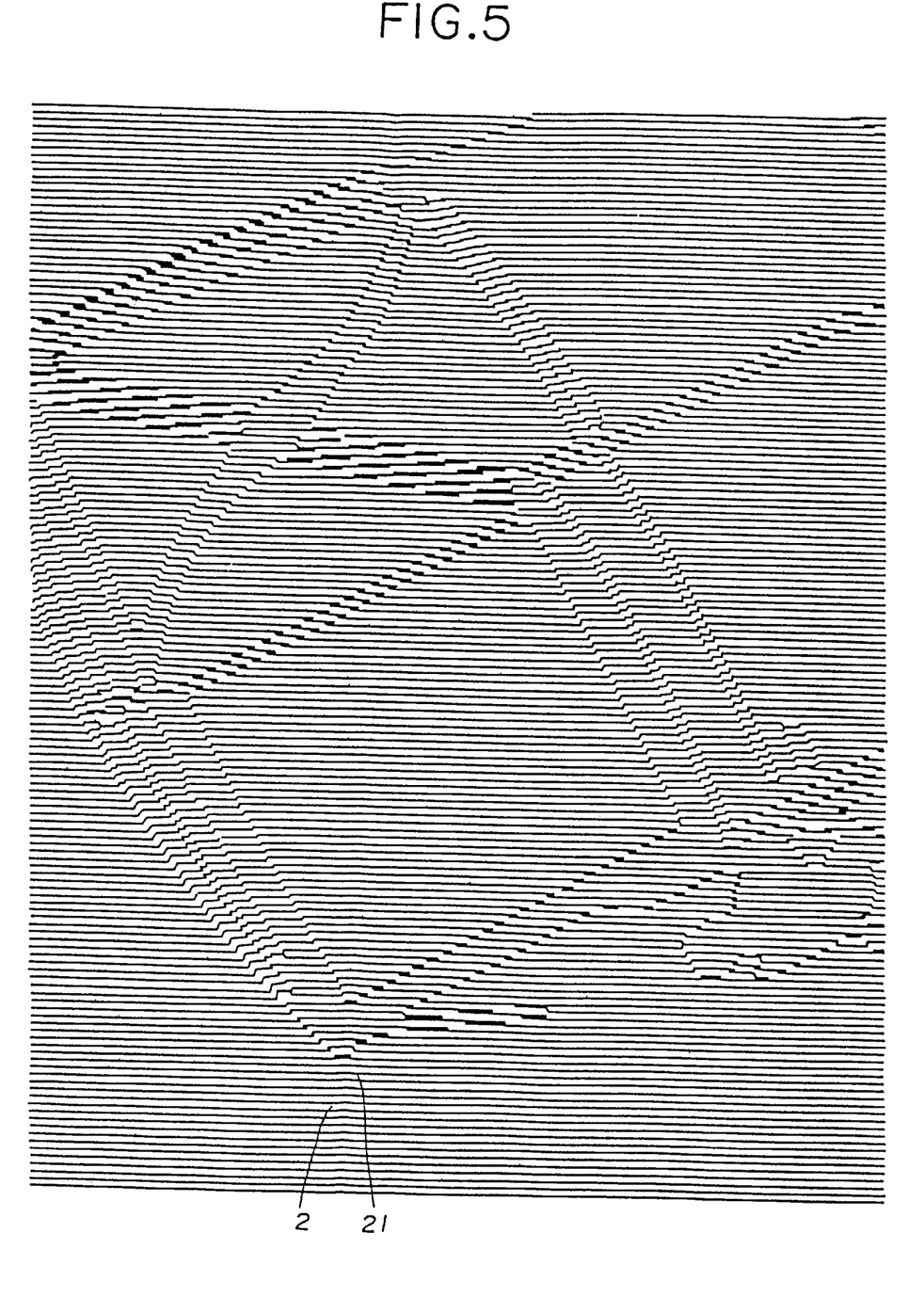
FIG. 5 is a partially enlarged view showing the front surface of the decorative sheet according to the third embodiment of the present invention.

FIG. 5 shows a partially enlarged view of the front surface 2. In FIG. 5, the striped pattern 21 consisting of parallel straight lines of 0.25 mm in width is formed on the front surface 2 at a pitch of 0.5 mm, and the contour lines of the pattern is formed by shifting the straight lines by half the pitch.

While the pattern is formed on the front surface 2 alone in the decorative sheet S3, such patterns may alternatively be formed on both of the front and rear surfaces 2 and 3, with the striped patterns 21 and 31 shifted by a certain pitch. Further, the patterns formed on both surfaces may have similar shapes. In this embodiment, the contour lines thereof are changed differently from each other, whereby further excellent decorativeness is attained.

A sample of this decorative sheet S3 has been applied to a tablecloth, to prove that the decorative sheet is at a low cost and excellent in design and decorativeness with sufficient practical strength. When the present invention is applied to such a tablecloth or the like, an opaque sheet-type substance such as an opaque sheet or nonwoven fabric is preferably stuck on either one of the front and rear surfaces of the decorative sheet.

Embodiment 4

Figure 6:
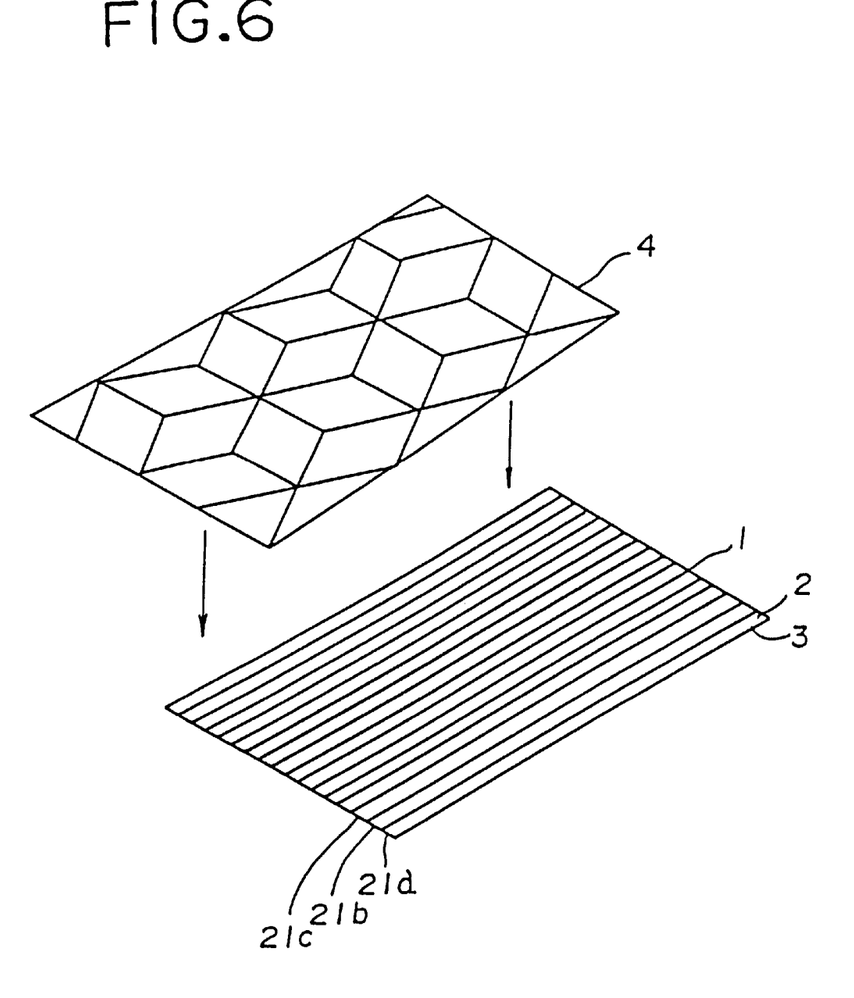
FIG. 6 is a perspective view showing a fourth embodiment of the present invention.

FIG. 6 shows a fourth embodiment of the invention.

In a decorative sheet 4 according to this embodiment, a projections-and-depressions pattern which is parallel to a striped pattern is provided on a front surface 2 of a transparent sheet body 1. In practice, the decorative sheet S4 is prepared by employing a transparent soft vinyl chloride sheet of 0.2 mm in thickness as the transparent sheet body 1. A striped pattern 21 formed of parallel black straight lines of 0.2 mm in width is printed on the front surface 2 of the sheet body 1 at a pitch of 0.4 mm. Further, a striped pattern 31 formed of red, blue and yellow straight lines 21a, 21b and 21c of 0.2 mm in width is printed on a rear surface 3 of the sheet body 1 at a pitch of 0.6 mm in coincidence with the striped pattern 21. Then, a sheet 4, which is a transparent soft vinyl chloride sheet of 0.3 mm on which a projections-and-depressions pattern, of combination of rhombuses formed by parallel straight lines of 0.25 mm in line width, is formed, is stuck on the transparent sheet body 1 in such a manner that the projections-and-depressions pattern is parallel to the striped pattern 21 provided on the front surface 2.

It has been recognized that light is refracted on the surface of the projections-and-depressions pattern provided on the sheet 4, so that its components interfere with each other, and the color tone or the colors of the transparent sheet body 1 are changed, with a moire fringes provided, to provide further decorativeness.

A sample of this decorative sheet S4 has been worked into a bathroom curtain and used, to prove that in places where the projections-and-depressions pattern and the straight lines of the striped pattern are parallel to each other, the colors vary with the angle of observation, with a moire fringes provided, and in the remaining places, the colors vary with the angle of observation, so that a stereoscopic effect to the decorative sheet S4 is provided.

Embodiment 5

Figure 7:
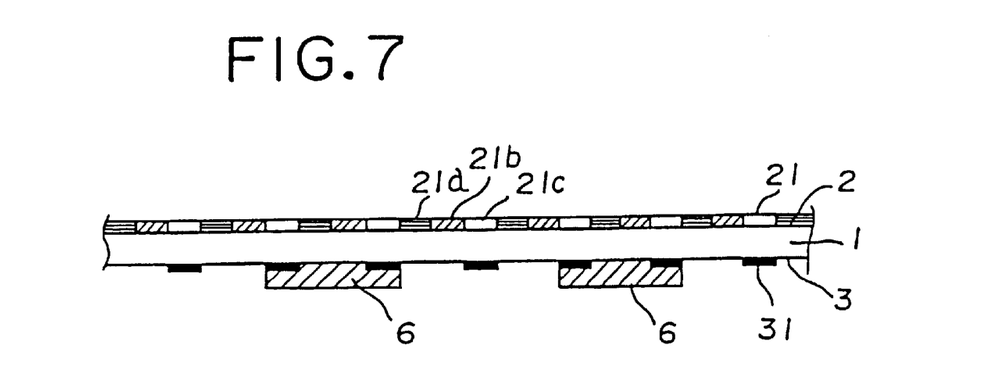
FIG. 7 is a sectional view showing a fifth embodiment of the present invention.

FIG. 7 shows a fifth embodiment of the invention.

A decorative sheet S5 according to this embodiment is formed by providing adhesive layers 6 on a rear surface 3 of a transparent sheet body. Namely, the adhesive layers 6 are formed in a stripe-shape on the rear surface 3 of the decorative sheet 5, which is identical to the decorative sheet S3 according to the third embodiment.

The adhesive layers 6 previously provided are useful for preventing the front and rear surfaces 2 and 3 of the decorative sheet S5 from being confused with each other. Further, the layers 6 prevent air accumulation when the decorative sheet S5 is stuck on a window. In addition, they can prevent the window glass from being broken into pieces and scattered.

Embodiment 6

Figure 8:
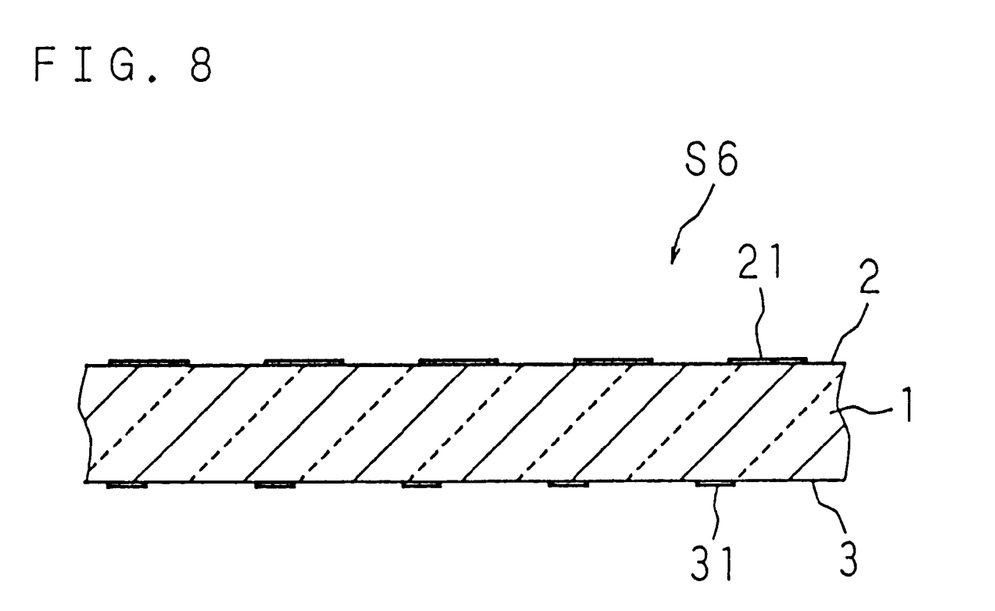
FIG. 8 is a sectional view showing a sixth embodiment of the present invention.

In a decorative sheet S6 shown in FIG. 8, there is formed on the rear surface 3 of the transparent sheet 1 a striped pattern 31 made by reducing a striped pattern 21 on the front surface 2. Concretely, on the front surface 2 of the transparent sheet 1 having a thickness of 0.4 mm, the striped pattern 21 having a pitch of 0.4 mm and a line width of 0.2 mm is formed in black color. On the rear surface 3, there is formed the striped pattern 31 obtained by constricting the stripes of 0.4 mm pitch, 0.1 mm line width, to about 98–99%, in black color.

When this decorative sheet S6 is observed from the front surface 2 side, by the action as described above and the action of parallax stereogram, there is obtained Moiré stripe which looks like having depth from the surface of the decorative sheet S6. The distance of the Moiré stripes is variable by a crossing angle is between the striped pattern 21 on the front surface 2 and the striped pattern 31 on the rear surface 3. The suitable ratio of constriction is presumed to be dependent on the thickness of the transparent sheet 1. In case of considering a thickness of the decorative sheet to be used in general, the amount of 95%–100% (excluding 100%) is presumed to be adequate. The line widths of the striped pattern 21 and striped pattern 31 are changeable, and the thicker the lines are, the whole color of the decorative sheet S6 having the Moiré stripes becomes darker, and the thinner the lines are, the lighter the sheet is.

It is known that Moiré stripe is obtained when one striped pattern is laid on the other. By varying the pitch ratio (in Embodiment 6, the pitch on the rear surface is smaller) the pattern shows a depth and stereographic showing.

Embodiment 7

In a decorative sheet of Embodiment 7, Moiré stripe is used as the striped pattern 31 to be formed on the rear surface 3, with an ordinary striped pattern 21 used for the front surface 2. These are crossed at a predetermined angle.

For example, as the striped pattern 31 of Moiré on the rear surface, a pattern obtained by overlapping two stripes of 0.4 mm pitch and 0.1 mm line width is formed by printing. When the striped pattern 31 and the striped pattern 21 of 0.4 mm pitch and 0.2 mm line width are formed with the crossing angle therebetween set to be about 15 degrees on the rear surface 3 and the front surface 2 of the transparent sheet 1 having a thickness of 0.4 mm, a pattern of rhombus having a side of several centimeters (or a lattice pattern with the line part having thinner color) is obtained by the Moiré phenomenon. This rhombus pattern has a depth and looks like submerged to become a very stereographic decorative sheet.

The size and shape of the rhombus pattern varies by the crossing angle. Also, the shading of the decorative sheet varies by the line widths of the striped patterns 21 and 31.

Embodiment 8

In Embodiment 7, after obtaining in advance Moiré stripe, it is printed on the rear surface 3 of the transparent sheet 1, but a similar effect is obtainable by labeling a printed sheet having the same pattern as the striped pattern 31 on the rear surface 3 of the decorative sheet S6 obtained in Embodiment 6.

Embodiment 9

Figure 9:
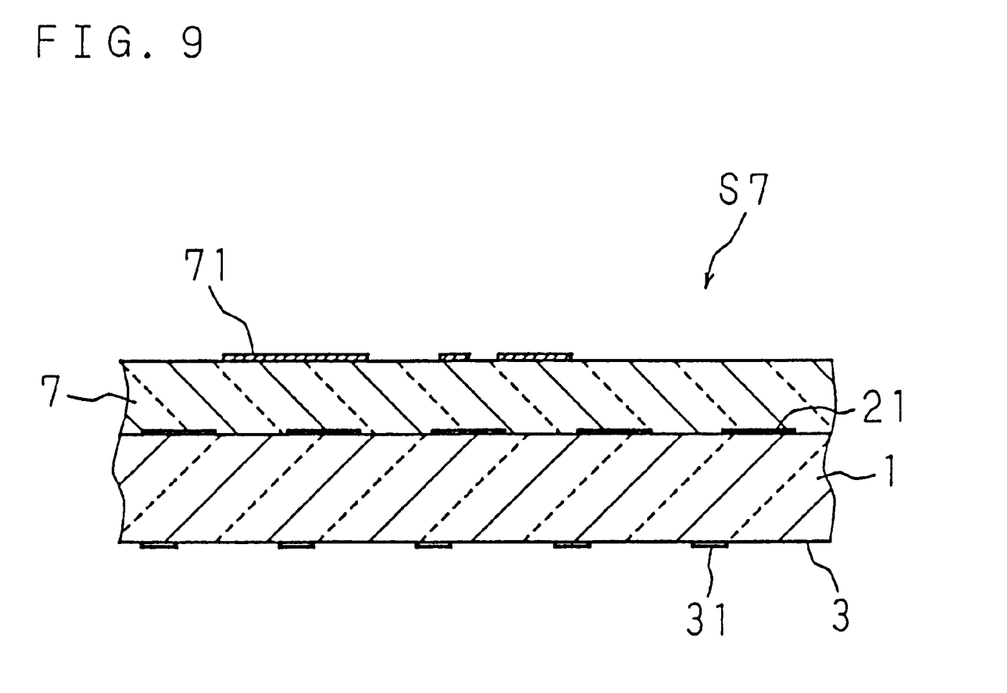
FIG. 9 is a sectional view showing a seventh embodiment of the present invention.

In a decorative sheet S7 shown in FIG. 9, there is labeled a printed sheet 7 made by printing an opaque pattern 71 on the front surface of the decorative sheet obtained in Embodiment 7. For example, the striped patterns 21 and 31 are formed in blue color, and a flapping bird design is formed in opaque white color and gray color as the pattern 71 of the printed sheet 7.

In this decorative sheet S7, the rhombus pattern looks deep in the background of the bird pattern 71, so that the bird pattern 71 is shown inversely as if it were floating up, and the design characteristics show great increase.

Embodiment 10

Figure 10:
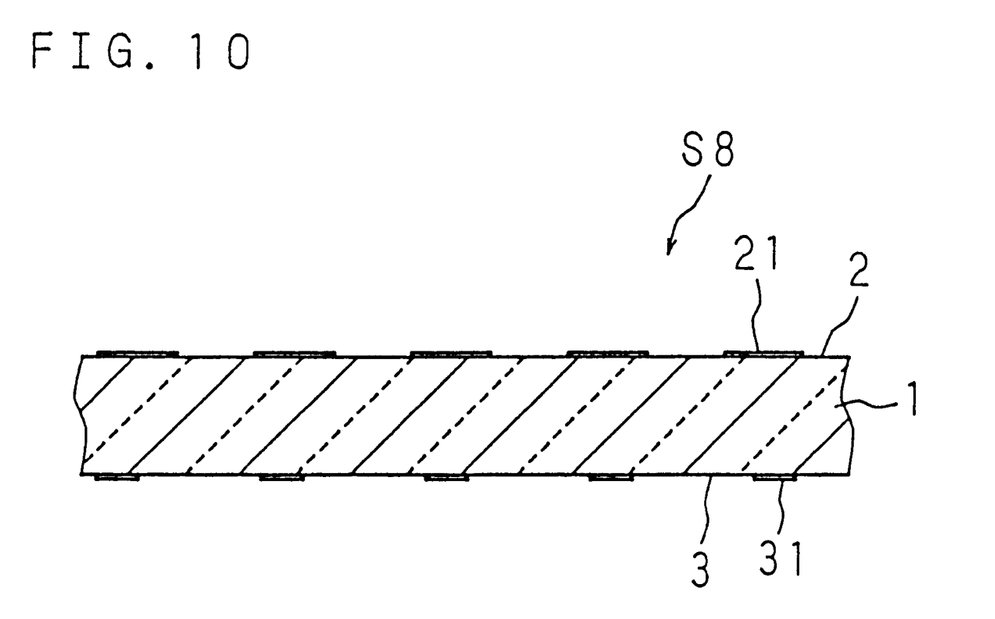
FIG. 10 is a sectional view showing a eighth embodiment of the present invention.

In the decorative sheet S8 shown in FIG. 10, contrary to Embodiment 6, a pattern 31 which has the pitch more enlarged (e.g., 101%) than the pitch of the striped pattern 21 on the front surface 2 is formed on the rear surface 3.

When this decorative sheet S8 is observed from the front surface 2 side, by the action mentioned above, there is obtained a stereographic Moiré stripe which looks like more floating to the front than the decorative sheet S8 surface. In the same manner as in the case of Embodiment 6, the interval of the Moiré stripes is changeable by the crossing angle between the striped pattern 21 on the front surface 2 and the striped pattern 31 on the rear surface 3. The ratio of the enlargement is considered to be dependent on the thickness of the transparent sheet 1, but in consideration of the thickness of the decorative sheet to be generally used, approximately no more than 105% is considered to be appropriate.

Embodiment 11

Contrary to Embodiment 7, here is formed on the rear surface 3 the Moiré striped pattern 31 obtained by overlapping two patterns of more enlarged pitch (e.g., 101%) than the pitch of the stripe 21 on the front surface 2. By this structure a pattern of rhombus having a side of several centimeters (or a lattice pattern with the line part having thinner color) is obtained by the Moiré phenomenon. This rhombus pattern looks like floating up.

In the same manner as in Embodiment 7, the size and shape of the rhombus pattern vary by crossing angle. Also, the shading of the decorative sheet varies by the line widths of the striped pattern 21, 31.

Embodiment 12

As practiced in Embodiment 8, a similar effect is obtainable by labeling a printed sheet having the same pattern as the striped pattern 31 on the rear surface of the decorative sheet S8 obtained in Embodiment 10 instead of printing Moiré striped pattern 31 on the rear surface 3 of the transparent sheet 1.

Embodiment 13

Figure 11:
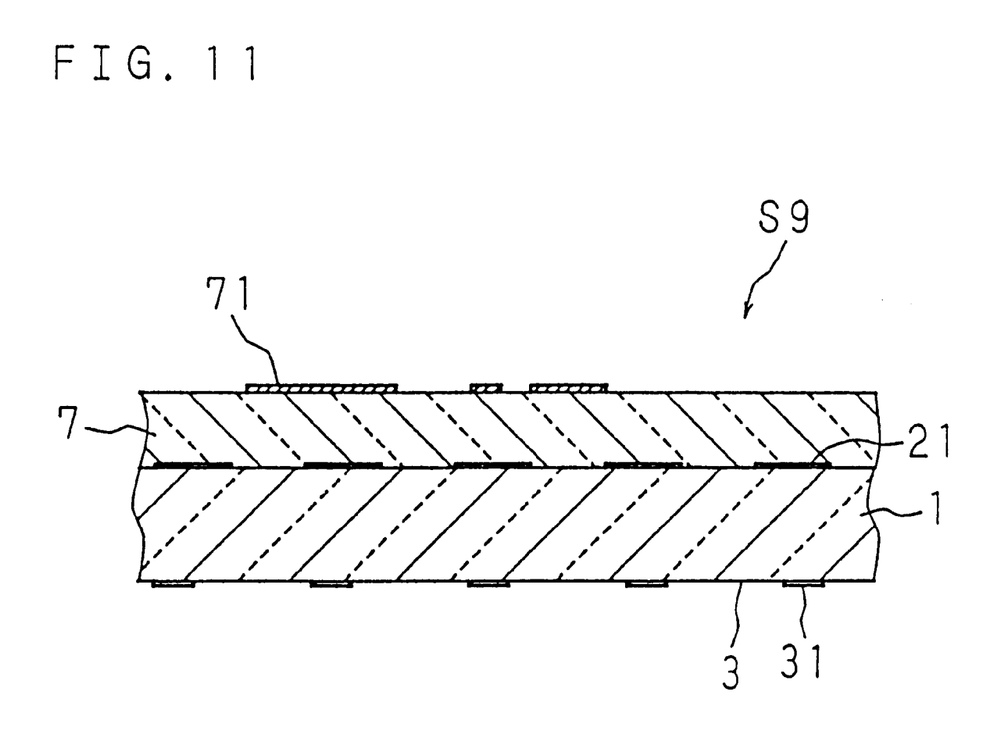
FIG. 11 is a sectional view showing a ninth embodiment of the present invention.

In a decorative sheet S9 shown in FIG. 11, in the same manner as in Embodiment 9, a printed sheet 7 on which the opaque pattern 71 is printed is labeled on the front surface of the decorative sheet obtained in Embodiment 11. For example, the striped patterns 21, 31 are formed in blue color, and as the pattern 71 of the print sheet 7, fish marks are formed in opaque white color and gray color.

In this decorative sheet S9, the rhombus pattern looks like floating up in the background of the fish pattern 71, so that the fish pattern 71 is shown inversely as if it were submerged, and the design characteristics show great increase.

As described in Embodiments 6–13, by varying the pitches of the striped pattern 21, 31 formed on the front surface 2 and the rear surface 3 of the transparent sheet 1, there can be obtained a decorative sheet having Moiré pattern which gives very stereographic feeling. And, the striped patterns 21, 31 may be of monochrome or multiple colors.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A decorative sheet comprising a transparent sheet having a certain thickness which is provided on its front surface and rear surface with parallel striped patterns at a predetermined pitch, the striped pattern on one side of the front surface and rear surface being formed by constricting or enlarging a pitch of the striped pattern provided on the other side.

2. A decorative sheet according to claim 1, wherein the striped pattern provided on the rear surface is made by constricting a pitch of the striped pattern provided on the front surface to a degree of about more than 94% and less than 100%.

3. A decorative sheet according to claim 2, wherein the pitch of the striped pattern provided on the rear surface is that made by constricting the pitch of the striped pattern provided on the front surface to a degree of about more than 94% and less than 100%, and the line width of the striped pattern provided on the rear surface is smaller than the line width of the striped pattern provided on the front surface.

4. A decorative sheet according to claim 1, wherein the striped pattern provided on one side of the front surface and the rear surface are not parallel to the striped pattern provided on the other side in a planar view.

5. A decorative sheet according to claim 4, wherein the striped pattern provided on the rear surface is made by constricting the pitch of the striped pattern provided on the front surface to a degree of about more than 94% and less than 100%.

6. A decorative sheet according to claim 5, wherein the pitch of the striped pattern provided on the rear surface is that made by constricting the pitch of the striped pattern provided on the front surface to a degree of about more than 94% and less than 100%, and the line width of the striped pattern provided on the rear surface is smaller than the line width of the striped pattern provided on the front surface.

7. A decorative sheet according to claim 6, further comprising an opaque sheet having an opaque pattern attached to the front surface.

8. A decorative sheet according to claim 1, wherein the striped pattern provided on the rear surface is formed by printing the Moiré which is obtained by displacing the two striped pattern made by constricting the striped pattern provided on the front surface to a degree of about more than 94% and less than 100% at a predetermined angle each other.

9. A decorative sheet according to claim 8, wherein the striped pattern provided on the rear surface is not parallel to the striped pattern provided on the front surface in a planar view.

10. A decorative sheet according to claim 9, further comprising a transparent sheet having an opaque pattern laid on the front surface.

11. A decorative sheet according to claim 2, further comprising a transparent second sheet having the striped pattern provided on the rear surface, said sheet being laid on the rear surface, wherein the striped pattern of the second sheet is not parallel to the striped pattern provided on said rear surface in a planar view.

12. A decorative sheet according to claim 11, wherein the striped pattern provided on the rear surface is not parallel to the striped pattern provided on the front surface in a planar view.

13. A decorative sheet according to claim 12, further comprising a transparent sheet having an opaque pattern laid on the front surface.

14. A decorative sheet according to claim 1, wherein the striped pattern provided on the rear surface is made by enlarging the striped pattern provided on the front surface to a degree of about more than 100% and less than 105%.

15. A decorative sheet according to claim 14, wherein the pitch of the striped pattern provided on the rear surface is that made by enlarging the pitch of the striped pattern provided on the front surface to a degree of about more than 100% and less than 105%, and the line width of the striped pattern provided on the rear surface is smaller than the line width of the striped pattern provided on the front surface.

16. A decorative sheet according to claim 4, wherein the striped pattern provided on the rear surface is made by enlarging the striped pattern provided on the front surface to a degree of about more than 100% and less than 105%.

17. A decorative sheet according to claim 16, wherein the pitch of the striped pattern provided on the rear surface is that made by enlarging the pitch of the striped pattern provided on the front surface to a degree of about more than 100% and less than 105%, and the line width of the striped pattern provided on the rear surface is smaller than the line width of the striped pattern provided on the front surface.

18. A decorative sheet according to claim 17, further comprising an opaque sheet having an opaque pattern attached to the front surface.

19. A decorative sheet according to claim 1, wherein the striped pattern provided on the rear surface is formed by printing the Moiré which is obtained by displacing a two striped pattern made by enlarging the striped pattern provided on the front surface to a degree of about more than 100% and less than 105% at a predetermined angle each other.

20. A decorative sheet according to claim 19, wherein the striped pattern provided on the rear surface is not parallel to the striped pattern provided on the front surface in a planar view.

21. A decorative sheet according to claim 20, further comprising a transparent sheet having an opaque pattern laid on the front surface.

22. A decorative sheet according to claim 14, further comprising a transparent second sheet having a striped pattern provided on the rear surface, said sheet being laid on the rear surface, wherein the striped pattern of the second sheet is not parallel to the striped pattern provided on said rear surface in a planar view.

23. A decorative sheet according to claim 22, wherein the striped pattern provided on the rear surface is not parallel to the striped pattern provided on the front surface in a planar view.

24. A decorative sheet according to claim 23, further comprising a transparent sheet having an opaque pattern laid on the front surface.

* * * * *